3,743,619
PROCESS FOR THE PRODUCTION OF SUSPENSIONS OF PHENOL-FORMALDEHYDE RESINS

Kazunori Kooguchi and Osamu Ito, Kawasako, Nobusake Makayama, Yokohama, and Yoshio Miyahara and Korenori Murai, Tokyo, Japan, assignors to Mitsui Toatsu Chemicals Incorporated, Tokyo, Japan
No Drawing. Filed Dec. 21, 1970, Ser. No. 100,382
Claims priority, application Japan, Dec. 29, 1969, 44/993
Int. Cl. C08g 51/24
U.S. Cl. 260—29.3       7 Claims

ABSTRACT OF THE DISCLOSURE

A process for the production of a suspension of a phenol-formaldehyde resin which comprises dispersing said resin into water, and using as dispersing agent an inorganic salt of naphthalenesulfonic or alkylnaphthalenesulfonic acid-formaldehyde condensate of the general formula:

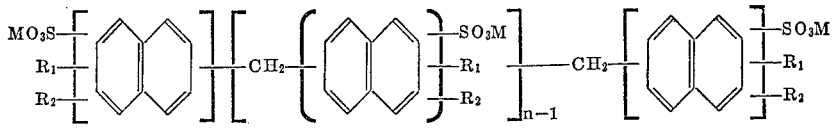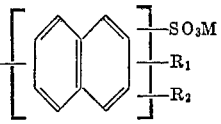

wherein M is alkali metal or ammonium $n$ is an integer of 1–9, and $R_1$ and $R_2$ are hydrogen or alkyl containing from 1 to 4 carbon atoms. A salt of a polyoxyethylene-alkylsulfate or alkylphenylsulfate of the general formula:

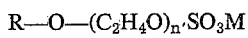
$$R-O-(C_2H_4O)_n \cdot SO_3M$$

wherein R is alkyl or alkylphenyl wherein the alkyl group contains 8–18 carbon atoms, $n'$ is an integer of at most 6 and M is alkali metal or ammonium, may be added as an auxiliary dispersing agent.

---

The present invention relates to a process for the production of suspensions of phenol-formaldehyde resins especially utilizable as material for preparation of pressure-sensitive copying paper.

It is generally known that a phenol or derivative thereof is reacted with formaldehyde in the presence of an acidic catalyst to yield a phenol-formaldehyde resin. In recent years interest has been shown in the use of phenol-formaldehyde resins as materials for pressure-sensitive copy paper in addition to their use as molding compounds.

There has come into use a pressure-sensitive copy material needing no carbon paper, or so-called "no-carbon paper." The material has the following form: a copy paper composed of an assembly consisting of an upper sheet of paper having microcapsules applied onto its lower surface and a lower sheet of paper having an acidic substance applied to its upper surface, the microcapsules being coated with a solid protective colloid and prepared according to a complex coacervation method from oily droplets containing a basic dye. The oily droplets are prepared by emulsifying a non-volatile oil with a basic dye dissolved in water aided by a protective colloid such as gum arabic or gelatin. The microcapsules on the paper are crushed under pressure and when the treated surfaces of both sheets of paper face each other, the oil containing the basic dye is released and brought into contact with the acidic substance on the upper surface of the lower sheet of paper to develop color.

Acid clays have been used by the prior art as the "acidic substance" referred to herein. However, they lose the required coloring action when atmospheric humidity is high and tend to discolor gradually with passage of time even after color is developed, thus making it inappropriate to use them for permanent documents.

With a view to improving this disadvantage, a process wherein reactive acidic polymers are employed (Japanese patent publn. No. 20,144/67) has been proposed. In this process, several examples are given for use of phenol-formaldehyde polymers.

Prior art processes for the production of phenol-formaldehyde polymers include that disclosed in Industrial Engineering Chemistry, vol. 43, pp. 134–141, January 1951. A phenol and formaldehyde in a mol ratio of 1:0.6–1.0 are reacted together in presence of one or more acidic catalysts such as hydrochloric acid, oxalic acid and p-toluenesulfonic acid and the reaction system is maintained at a pH of 1–2 or lower. The mixture is heated under reflux for a certain period of time and then water is separated from the reaction mixture; alternatively the reaction mixture is heated under atmospheric pressure, or, if desired, under reduced pressure, to a temperature of 120–180° C. whereby water and unreacted materials are eliminated. After cooling, the solidified product is crushed to yield a lumpy polymer.

A general method for applying such resins onto paper comprises pulverizing the resin into a fine powder by means of a powerful crusher, adding to the powder a dispersing agent, spreading agent and similar additives to form an aqueous dispersion and applying it to the paper. However, suspensions of such phenol-formaldehyde resins are so extremely unstable that sedimentation proceeds rapidly when the suspension is allowed to stand at rest. Thus, it has been necessary to prepare the suspension just before use and maintain it in a continuously agitated state. In addition, sedimentation or coagulation often takes place during application of the suspension, thus causing difficulties in operation of suitable apparatus. Consequently, prodigious and time-consuming operations are necessary for overhauling the apparatus and productivity is extremely reduced.

When a suspension in such an unstable state is applied to paper, the applied amount will often become uneven and the state of dispersion of the applied resin particles will be different in different localities so that the coloring speed of the copy paper and the resulting color density are uneven, thus making it quite impossible to obtain pressure-sensitive copy paper of good quality.

Accordingly, it is a primary object of the present invention to produce a stable suspension of a phenol-formaldehyde resin which does not precipitate or settle out when allowed to stand at rest.

It is another object of the present invention to prevent coagulation of the suspension thereby stabilizing the operation of the apparatus used to apply the suspension to paper.

It is a further object of the present invention to provide a copy paper of good quality in which the applied amount of the resin and the state of particles thereof are uniform.

A variety of dispersing agents are generally known and utilized, according to their individual purposes, in combination with substances to be dispersed. However, there is no general rule in selection of such combinations. Consequently, various dispersing agents have been developed. A phenolsulfonic acid-formaldehyde condensate disclosed, for example, in British Pat. 523,222 is found to be effective as a dispersing agent for phenol-formaldehyde resins. However, this dispersing agent fails to exhibit sufficient effect for the purpose of the present invention.

It has now been found that when a phenol-formaldehyde resin is dispersed into water, a very stable aqueous suspension can be produced by using as dispersing agent an inorganic salt of a condensate of naphthalenesulfonic or alkyl-naphthalenesulfonic acid and formaldehyde represented by the general formula:

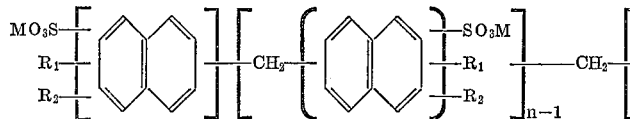 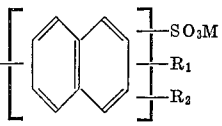

wherein M is alkali metal or ammonium, $n$ is an integer of 1–9, and $R_1$ and $R_2$ are hydrogen or alkyl containing from 1 to 4 carbon atoms. Among the alkyls represented by $R_1$ and $R_2$, those particularly suitable for the present invention include methyl, ethyl, propyl, isopropyl, n-butyl, sec-butyl and tert-butyl.

Naphthalenesulfonic or alkyl-naphthalenesulfonic acid to be condensed with formaldehyde may be alpha-sulfonic or beta-sulfonic acid.

Suitable alkyl-naphthalene-alpha-sulfonic acids are:

monoalkylnaphthalene-alpha-sulfonic acids, such as
2-methylnaphthalene-1-sulfonic acid,
4-methyl-naphthalene-1-sulfonic acid,
7-methylnaphthalene-1-sulfonic acid,
4-ethylnaphthalene-1-sulfonic acid,
2-isopropylnaphthalene-1-sulfonic acid,
5-isopropylnaphthalene-1-sulfonic acid, and
6-n-butylnaphthalene-1-sulfonic acid; and
dialkylnaphthalene-alpha-sulfonic acids such as
2,6-dimethylnaphthalene-1-sulfonic acid,
3,7-dimethylnaphthalene-1-sulfonic acid,
6,7-dimethylnaphthalene-1-sulfonic acid,
4,7-dimethylnaphthalene-1-sulfonic acid,
4,6-di-n-butylnaphthalene-1-sulfonic acid,
2,6-di-tert-butylnaphthalene-1-sulfonic acid, and
3,7-di-tert-butylnaphthalene-1-sulfonic acid.

Suitable alkyl-naphthalene-beta-sulfonic acids are: monoalkylnaphthalene-beta-sulfonic acids, such as 1-methylnaphthalene-2-sulfonic acid,
4-methylnaphthalene-2-sulfonic acid,
6-methylnaphthalene-2-sulfonic acid,
8-methylnaphthalene-2-sulfonic acid,
6-isopropylnaphthalene-2-sulfonic acid,
1-n-butylnaphthalene-2-sulfonic acid, and
7-tert-butylnaphthalene-2-sulfonic acid; and
dialkylnaphthalene-beta-sulfonic acids such as
3,6-dimethylnaphthalene-2-sulfonic acid,
3,7-dimethylnaphthalene-2-sulfonic acid,
6,7-dimethylnaphthalene-2-sulfonic acid,
4,7-diisopropylnaphthalene-2-sulfonic acid,
3,8-diisopropylnaphthalene-2-sulfonic acid, and
3,7-di-tert-butylnaphthalene-2-sulfonic acid.

Suitable methods for the preparation of the alkylnaphthalenesulfonic and naphthalenesulfonic acids are disclosed, for example, in the German Pat. No. 1,058,983 and elsewhere. The dispersing agent is employed preferably in an amount of 3–15% by weight based on the phenol-formaldehyde resin.

The stabilizing effect can be enhanced by jointly using as auxiliary dispersing agent a salt of a polyoxyethylenealkylsulfate or alkylphenylsulfate of the general formula:

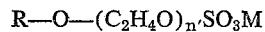

wherein R is alkyl or alkylphenyl in which the alkyl group contains 8–18 carbon atoms, $n'$ is an integer of at most 6 and M is an alkali metal or ammonium. Among these auxiliary dispersing agents, those particularly effective for the present invention include sodium polyoxyethylenestearylsulfate, sodium polyoxyethylenedodecylsulfate, sodium polyoxyethylenenonylphenylsulfate, etc. These compounds are incorporated preferably in an amount of 0.1–1% by weight based on the phenol-formaldehyde resin.

The phenol-formaldehyde resins suitable for use in the present invention are prepared by reacting the formaldehyde component i.e. formaldehyde, Formalin, paraform the phenol component in a mol ratio of 0.6–1.0:1.0 and aldehyde or other formaldehyde-forming compound with in presence of an acidic catalyst. The resins are characterized by the general formula:

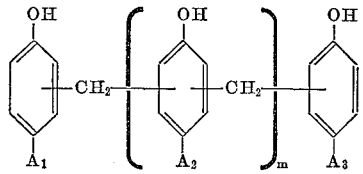

wherein $m$ is an integer from 0 to 10 and $A_1$, $A_2$ and $A_3$ each represent a substituent selected from the group consisting of alkyl, cycloalkyl, aryl, aralkyl and halogen.

More particularly, $A_1$, $A_2$ and $A_3$ each may be a suitable substituent selected from the following:

(a) alkyl groups containing 1 to 18 carbon atoms in any of their isomeric forms;
(b) cycloalkyl groups containing 5 to 18 carbon atoms;
(c) aryl or aralkyl groups containing 6 to 18 carbon atoms;
(d) halogen radicals including chlorine, bromine and fluorine radicals.

Suitable substituted phenols for the present invention include p-cresol, p-ethylphenol, p-sec.-butylphenol, p-tert-butylphenol, p-tert-amylphenol, p-tert-hexylphenol, p-isooctylphenol, p-nonylphenol, p-decylphenol, p-dodecylphenol, p-tetradecylphenol, p-octadecylphenol; p-cyclohexylphenol; p-phenylphenol; p-chlorophenol, p-bromophenol. These can be employed alone or in mixtures as the starting material for the resin. Further, a mixture of resins can also be used. Especially useful among the above-mentioned para-substituted phenols are p-chlorophenol and p-phenyl-phenol.

An aqueous suspension of the condensate can be produced by a wet pulverizing method using in the conventional manner said dispersing agent and a colloid mill, roll mill, sand-grinding mill, etc. The particle size of the phenol-formaldehyde resin in the aqueous suspension is 5 microns or less, preferably 1 micron or less. If a resin having a larger particle size is used, stability of the suspension will be reduced and the coloring effect when using the condensate for pressure-sensitive copy paper will be degraded.

The content of the phenol-formaldehyde resin in the aqueous suspension can freely be adjusted below about 60% by weight. A lower concentration is preferred for evenly applying the suspension to paper for pressure-sensitive copy assembly, whereas a higher concentration is advantageous when the suspension is handled for transportation. According to the process of this invention, stability of the suspension is not affected even when the suspension is prepared at a high concentration and diluted, at the time of use, with water to a desired concentration. Thus, a suspension of high concentration is usually produced.

Furthermore, the aqueous suspensions of the present invention may be dried by conventional procedures employing, for example, a spray drier or a drum drier. The resulting solid product is pulverized into a fine powder having a particle size which will pass through a 100 or preferably 150 Tyler mesh sieve. The resulting powder gains an advantage over the aqueous suspension in convenience in handling or transportation, and even after prolonged storage may be easily restored to the original aqueous suspension by merely adding the necessary amount of water with stirring.

When a lumpy phenol-formaldehyde resin obtained by conventional procedures is employed, the resin must be subjected, prior to production of the aqueous suspension, to a dry pulverizing treatment using a powerful crusher. However, such crushing and pulverizing treatment is very troublesome, since scattering of fine powders during pulverization of the lumpy resin not only causes an unfavorable operative environment but also tends to form an explosive dust. When the resin is employed particularly as a material for pressure-sensitive copy paper, pulverization of the resin will largely affect the desired coloring effect. Although uniform distribution of the particle size is most important, control of the pulverization operation is very difficult.

Thus, a preferred method for attaining the purpose of this invention comprises dissolving the phenol-formaldehyde resin in an aqueous alkali, adding an acid to the aqueous solution to form a precipitate, filtering the precipitate to obtain a wet filter cake and then using the filter cake. More preferably, an aqueous suspension of especially good properties is obtained by effecting the resin formation by condensing a phenol and formaldehyde in the presence of an acidic catalyst and an organic solvent, adding an aqueous alkali to dissolve the formed resin, separating the organic solvent from the aqueous solution, adding an acid with vigorous agitation to form a precipitate, filtering the precipitate and using the resultant wet filter cake of the phenol-formaldehyde resin. In this condensation reaction, the molar ratio of the phenol to formaldehyde is 0.6–1.0:1.0 and benzene, toluene, xylene, pentane, heptane, hexane, cyclohexane, tri-chloroethane, etc. are suitable as the organic solvent. An alkali such as caustic soda used for dissolving the resin is used in a quantity sufficient to dissolve the resin and the quantity is generally within the range of 0.3–1.0 mol per mol of the phenol used. In addition, the quality of the product is improved when the concentration of the resin in the alkaline solution is low and the concentration is preferably 10% by weight or less.

The precipitation temperature is within the range from ambient temperature to 70° C., preferably 15°–45° C. A conventional inorganic or organic acid such as hydrochloric acid, sulfuric acid, oxalic acid, acetic acid or phosphoric acid is employed for neutralizing the alkaline solution to a pH value of 7 or less to precipitate the resin therefrom. On precipitation of the resin, it is preferred to effect vigorous agitation at a temperature below 70° C. so that the precipitated resin is in an amorphous particulate form having a diameter ranging from 3 to 80 microns. At temperatures below 70° C., growth of the polymer crystal lattice is imperfect and the resulting resin has a low degree of crystallinity measured by X-ray diffraction and has a large content in the amorphous form which causes rapid color development of the basic dye brought into contact therewith. A wet cake thus obtained can be converted very easily into an aqueous suspension, without necessity of troublesome procedures such as drying and crushing.

As the aqueous suspension obtained according to this method has excellent stability and the particle size of the resin is small and uniform, the suspension is especially suitable for preparing pressure-sensitive copy paper which is uniform in quality and excellent in coloration.

The present invention will be more fully understood with reference to the following examples.

EXAMPLE 1

Into a 100 liter stainless steel reactor were charged 20 kilograms of p-chlorophenol, 3.5 kilograms of 80% paraformaldehyde, 200 grams of p-toluenesulfonic acid and 17.5 kilograms of benzene. The mixture was heated under agitation to effect reaction at 70–90° C., and water formed during the reaction was removed from the reaction system as an azeotrope with benzene. After completion of the reaction, 10.3 kilograms of 30% caustic soda solution were added to dissolve the reaction product and, after recovery of benzene by heating, the solution was diluted with 500 liters of water. 35 percent hydrochloric acid was added dropwise to the solution to precipitate a polymer which was then filtered by means of a centrifugal separator. 20.4 kilograms of the resin on a dry basis were thus obtained as a wet cake having a moisture content of about 50%.

To this wet cake was added 2 kilograms of sodium salt of beta-naphthalenesulfonic acid-formaldehyde condensate and 0.1 kilogram of sodium polyoxyethylenestearylsulfate together with 7 kilograms of water. The mixture was finely divided with the aid of a high-speed disperser to have an average particle size of 1 micron whereupon about 50 kilograms of a 40% suspension of the resin were obtained. This suspension had a viscosity of about 30 centipoises and was convenient to handle and effective as a material for pressure-sensitive copy paper, since the suspension neither settled out nor formed a gel upon standing for lengthy periods of time. The results of this example are shown in the following Table 1 as Experiment 1.

EXAMPLE 2

11.9 kilograms of p-phenylphenol and 9.0 kilograms of p-chlorophenol were reacted with 3.7 kilograms of paraformaldehyde in the presence of 27.5 kilograms of benzene and 210 grams of p-toluenesulfonic acid in a manner similar to that described in Example 1. 16.8 kilograms of 33% aqueous caustic soda solution were added and the reaction product was dissolved therein with heating. Benzene was distilled off and the solution was then diluted with about 500 liters of water. To the solution, 35% hydrochloric acid was added dropwise with agitation to precipitate a resin which was then filtered. 21.3 kilograms of the resin on a dry basis were thus obtained as a wet cake having a moisture content of about 53%.

To this wet cake was added 2.1 kilograms of sodium salt of beta-naphthalenesulfonic acid-formaldehyde condensate, 0.11 kilogram of sodium polyoxyethylenestearylsulfate and 5.3 kilograms of water. The mixture was worked up in a manner analogous to that described in Example 1 to obtain a suspension of the resin which, as shown by Experiment No. 15 in Table 1, maintained stability for 3 months. A pressure-sensitive copy paper prepared by application of this aqueous suspension had excellent properties especially in initiation of color formation and in color density, when compared with a pressure-sensitive copy paper prepared using a conventional phenol-formaldehyde condensate.

EXAMPLE 3

28.0 kilograms of p-phenylphenol, 3.7 kilograms of 80% paraformaldehyde and 0.28 kilograms of p-toluenesulfonic acid were reacted together in 43.2 kilograms of benzene in a manner similar to that described in Example 1. After completion of the reaction, 19.2 kilograms of a 33% aqueous caustic soda solution were added and the reaction product was dissolved therein with heating. After removal of benzene by distillation, dilute hydrochloric acid was added dropwise to the solution with stirring and the pH of the solution was adjusted to within a range of 4–5 to precipitate a polymer which was then filtered and washed with water to obtain 55.4 kilograms of wet cake containing 29.5 kilograms polymer, dry basis.

To this wet cake was added 3 kilograms of sodium salt of alpha-methyl-beta-naphthalenesulfonic acid-formaldehyde condensate and 15.4 kilograms of water. The mixture was worked up in a manner similar to that described in Example 1 to obtain a 40% aqueous suspension of good quality which was stable as shown by Experiment No. 10 in Table 1 and provided a pressure-sensitive copy paper having excellent color formation.

EXAMPLE 4

A 40% aqueous suspension prepared by admixing the p-chlorophenol-formaldehyde resin obtained in Example 1 with the sodium salt of beta-naphthalenesulfonic acid-formaldehyde condensate and the sodium salt of polyoxyethylenedodecylsulfate was mixed in weight ratios of 3:1, 1:1 and 1:3 with a 40% aqueous suspension prepared by admixing a resin obtained from tert-butylphenol as the starting phenol component in a manner similar to that described in Example 1 with the sodium salt of beta-naphthalenesulfonic acid-formaldehyde condensate and the sodium salt of polyoxyethylenedodecylsulfate. All of these mixed aqueous suspensions maintained their stability for 3 months and were materials of good quality for use in pressure-sensitive copy paper.

EXAMPLE 5

22 kilograms of the aqueous suspension of p-chlorophenol-formaldehyde resin of Example 1 were dried with a laboratory spray drier at an average dryer temperature of 55° C. and an average feed of 4 kg./hr. 9.5 kilograms of dry powder obtained was further pulverized with a laboratory impulse pulverizer to obtain a fine powder able to pass a 150 Tyler mesh sieve. One weight part of the resulting product was mixed with 1.5 weight parts of water to obtain an aqueous suspension of the resin having stability equal to that of the original suspension.

The following Table 1 illustrates a comparison of the stability of aqueous suspensions using the dispersing agents of the present invention with suspensions containing no dispersing agent or a dispersing agent of the prior art. The dispersion stability of each of the various suspensions was evaluated by allowing the suspension to stand at rest in a glass cylinder and observing whether or not the resin settled out of suspension or coagulated.

said resin into water to form a suspension containing from 30% to below about 60% by weight of said resin, and using as dispersing agent from 3 to 15% by weight of said resin of an inorganic salt of naphthalenesulfonic or alkylnaphthalene sulfonic acid-formaldehyde condensate of the general formula:

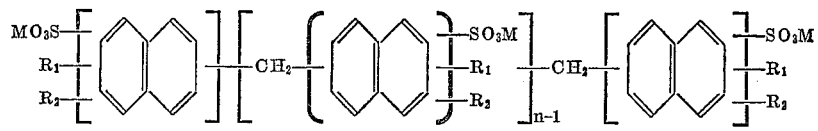

wherein M is a member selected from the group consisting of alkali metal and ammonium, $n$ is an integer of 1–9, and each $R_1$ and $R_2$ is a member selected from the group consisting of hydrogen and alkyl containing from 1 to 4 carbon atoms, said resin being prepared by reacting the formaldehyde component with the phenol component in a mol ratio of 0.6–1.0:1.0 in the presence of an acidic catalyst.

2. The process according to claim 1 wherein from 0.1 to 1% by weight of said resin of a salt of polyoxyethylenealkylsulfate of alkylphenylsulfate of the general formula:

$$R\text{---}O\text{---}(C_2H_4O)_{n'}SO_3M$$

wherein R is a member selected from the group consisting of alkyl and alkylphenyl wherein the alkyl group contains 8–18 carbon atoms, $n'$ is an integer of at most 6 and M is a member selected from the group consisting of alkali metal and ammonium, is used as an auxiliary dispersing agent.

3. The process according to claim 1 wherein said phenolformaldehyde resin is used in the form of a precipitate obtained by adding an acid to an aqueous alkaline solution of a condensate of a phenol and formaldehyde.

4. The process according to claim 3 wherein said precipitate is obtained by condensing said phenol and formaldehyde in presence of an acidic catalyst and an organic solvent, adding an aqueous alkaline solution to the condensation product to dissolve the formed resin and form a solution containing not more than 10% by weight of said resin, separating the organic solvent from the aqueous solution, adding an acid to form a precipitate and separating the precipitate from said solution.

TABLE 1

| Exp. No. | Phenol component in condensate resin | Concentration of condensate (percent by weight) | Identity and amount of dispersing agent (percent by weight based on resin) | Stability | Remarks |
|---|---|---|---|---|---|
| 1 | p-Chlorophenol | 40 | (A)—10.0; (B)—0.5 | Stable for 3 months | Present invention (Example 1). |
| 2 | do | 40 | (C)—10.0; (B)—0.5 | Stable for at least one month | Present invention. |
| 3 | do | 30 | (D)—5.0 | do | Do. |
| 4 | do | 30 | (E)—10.0 | Coagulation took place 24 hours after preparation | Comparative Example. |
| 5 | do | 30 | (F)—10.0 | Coagulation took place just after preparation | Do. |
| 6 | do | 30 | (G)—10.0 | do | Do. |
| 7 | do | 30 | None | Sedimentation took place just after preparation | Control. |
| 8 | p-Phenylphenol | 40 | (A)—10.0; (H)—0.5 | Stable for 3 months | Present invention. |
| 9 | do | 30 | (A)—5.0 | Stable for at least one month | Do. |
| 10 | do | 40 | (C)—10.0 | do | Present invention (Example 3). |
| 11 | do | 40 | (E)—10.0 | Coagulation took place within 2–3 days after preparation. | Comparative Example. |
| 12 | do | 40 | (I)—10.0 | Coagulation took place just after preparation | Do. |
| 13 | do | 40 | (J)—10.0 | do | Do. |
| 14 | do | 30 | None | Sedimentation took place just after preparation | Control. |
| 15 | p-Chlorophenol; p-phenylphenol (cocondensate). | 40 | (A)—10.0; (B)—0.5 | Stable for 3 months | Present invention (Example 2). |
| 16 | p-tert-Butylphenol | 40 | (A)—10.0; (H)—0.5 | do | Present invention (Example 4). |

NOTE.—The dispersing agents identified by the letters (A)–(J) in Table 1 are as follows: (A)=Na salt of beta-naphthalenesulfonic acid-formaldehyde condensate; (B)=Na salt of polyoxyethylenestearyl-sulfate; (C)=Na salt of alpha-methyl-beta-naphthalene-sulfonic acid-formaldehyde condensate; (D)=K salt of beta-naphthalenesulfonic acid-formaldehyde condensate; (E)=Na salt of phenolsulfonic acid-formaldehyde condensate; (F)=Na salt of a higher alcohol sulfate (Emal 40 available from Kao-Atlas K.K.); (G)=Oxyethylene-oxypropylene block polymer (Emalgen PP-150 available from Kao-Atlas K.K.); (H)=Na salt of polyoxyethylenedodecyl-sulfate; (I)=Na salt of dodecylbenzenesulfonic acid (Neoperex available from Kao-Atlas K.K.); (J)=Na salt of alkylnaphthalenesulfonic acid (Perex NB available from Kao-Atlas K.K.).

What is claimed is:

1. A process for the production of a suspension of a phenol-formaldehyde resin which comprises dispersing 5. The process according to claim 4 wherein the precipitation temperature is in the range from ambient temperature to 70° C.

6. The process according to claim 4 wherein the organic solvent is selected from the group consisting of benzene, toluene, xylene, pentane, heptane, hexane, cyclohexane and trichloroethane and the acid added to form the precipitate is selected from a group consisting of hydrochloric acid, sulfuric acid, oxalic acid, acetic acid and phosphoric acid.

7. The process according to claim 1 wherein said phenolformaldehyde resin has the formula:

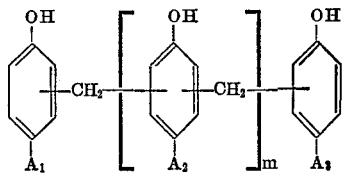

wherein $m$ is an integer from 0 to 10 and $A_1$, $A_2$ and $A_3$ each represent a substituent selected from the group consisting of alkyl containing 1 to 18 carbon atoms, cycloalkyl containing 5 to 18 carbon atoms, aryl and aralkyl containing 6 to 18 carbon atoms and halogen.

References Cited
UNITED STATES PATENTS

| | | | |
|---|---|---|---|
| 2,473,145 | 6/1949 | Hesselbart | 260—57 A |
| 3,300,427 | 1/1967 | Hebert | 260—29.3 |
| 3,304,345 | 2/1967 | Le Blanc | 260—29.3 |
| 3,361,693 | 1/1968 | Greschwind | 260—29.3 |
| 3,419,527 | 12/1968 | Akutin et al. | 260—57 A |

LORENZO B. HAYES, Primary Examiner

U.S. Cl. X.R.

260—57 A, 59